Dec. 7, 1965 D. B. WILKINS 3,222,048
HYDRO-PNEUMATIC SUSPENSION UNITS FOR VEHICLES
Filed Oct. 17, 1963 4 Sheets-Sheet 1
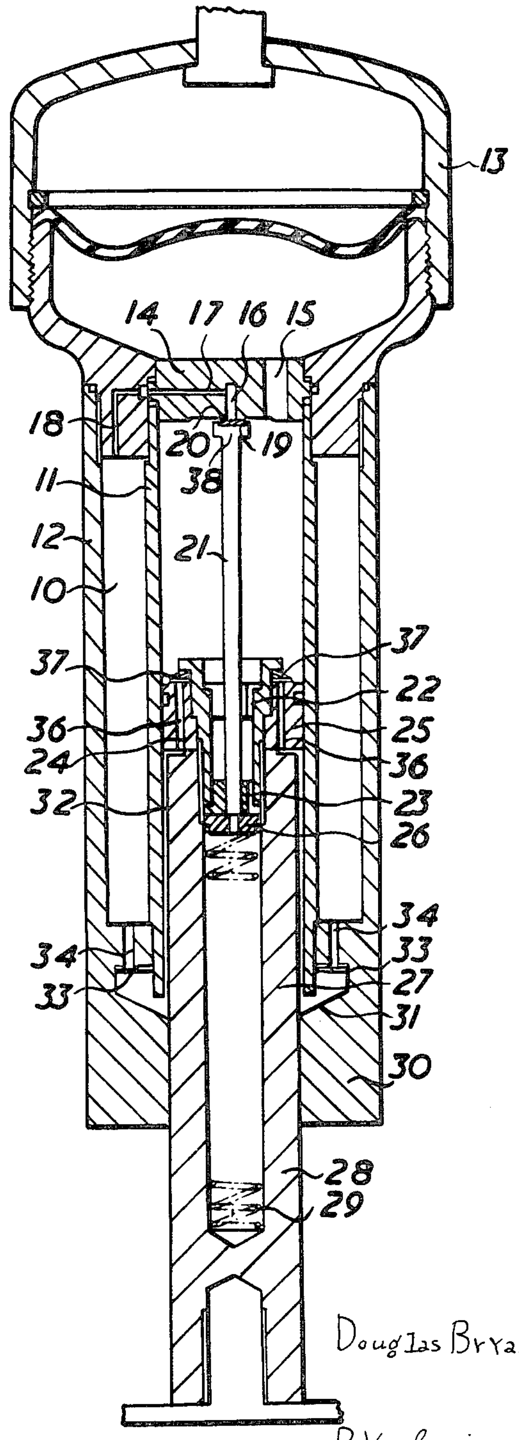
Douglas Bryan Wilkins
BY Scrivener & Parker

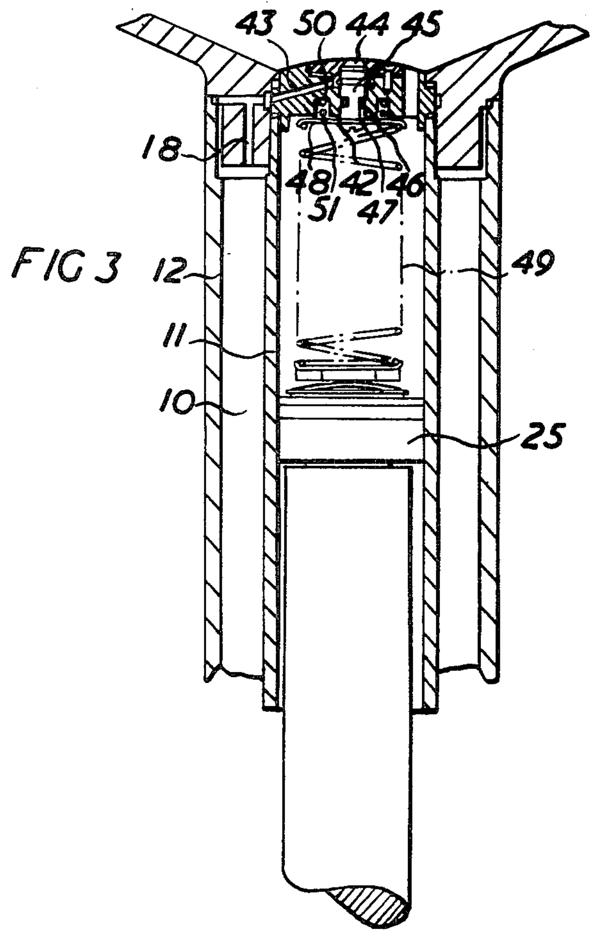
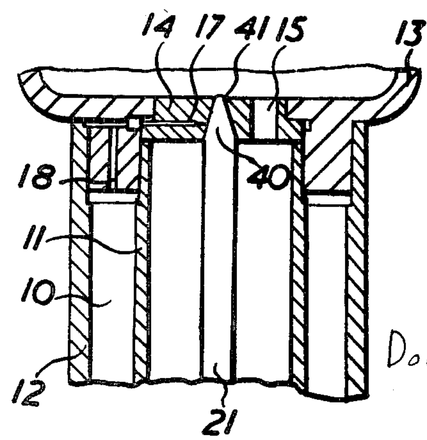
Douglas Bryan Wilkins
BY Scrivener & Parker

HYDRO-PNEUMATIC SUSPENSION UNITS FOR VEHICLES
Filed Oct. 17, 1963 4 Sheets-Sheet 3
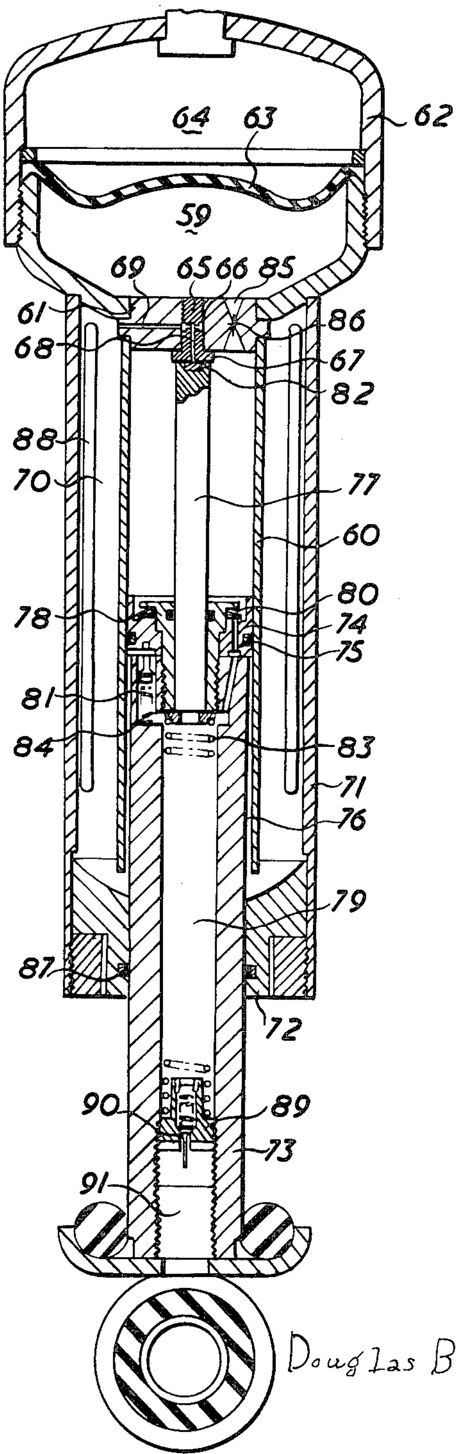
Douglas Bryan Wilkins
Scrivener & Parker HYDRO-PNEUMATIC SUSPENSION UNITS FOR VEHICLES
Filed Oct. 17, 1963 4 Sheets-Sheet 4
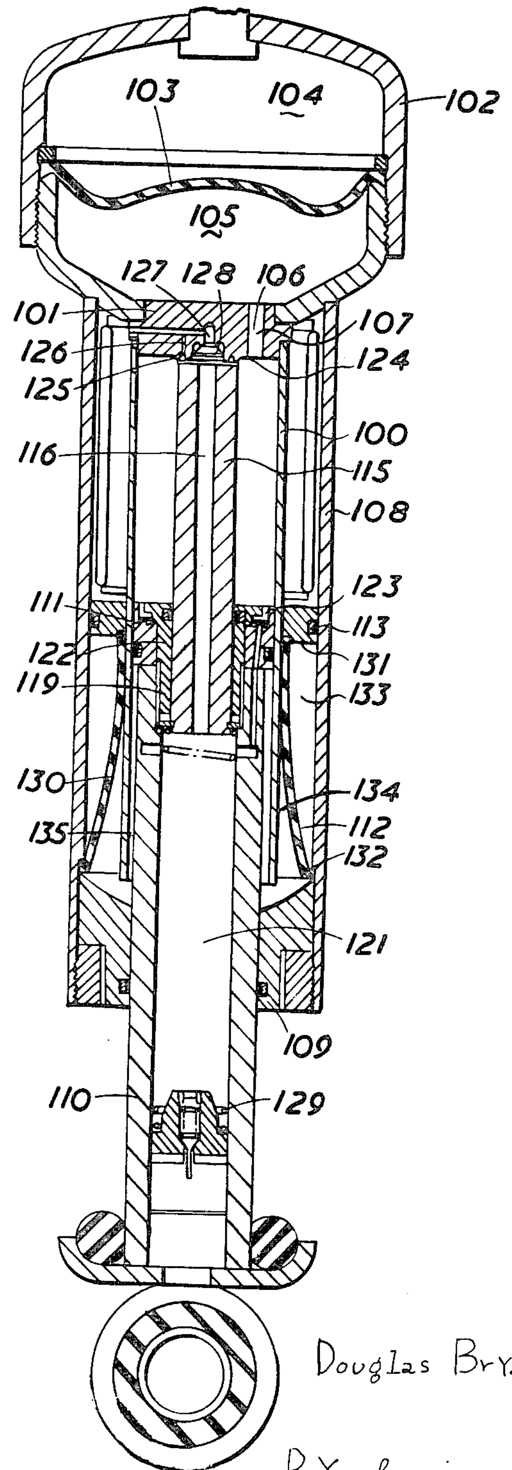
Douglas Bryan Wilkins
BY Scrivener & Parker United States Patent Office 3,222,048

Patented Dec. 7, 1965

3,222,048
HYDRO-PNEUMATIC SUSPENSION UNITS FOR VEHICLES

Douglas Bryan Wilkins, Solihull, England, assignor to Girling Limited, Birmingham, England, a British company Filed Oct. 17, 1963, Ser. No. 316,905
Claims priority, application Great Britain, Oct. 17, 1962, 39,245/62
9 Claims. (Cl. 267—64)

This invention relates to improvements in hydro-pneumatic suspension units for vehicles and more particularly to units of the kind adapted to act as self-levelling pneumatic springs.

In such units relative axial movement between a piston and a cylinder which are connected between sprung and unsprung parts of a vehicle causes liquid to be drawn from a reservoir and pumped into a chamber containing a volume of air or other gas under pressure, the air or other gas forming a pneumatic spring. The transfer of liquid from the reservoir to the pressure chamber increases the effective length of the unit, and the sprung part of the vehicle, which is usually the vehicle body, is raised to a level at which it is maintained by allowing liquid to return from the pressure chamber to the reservoir when that level is reached.

Usually the level is controlled by a port in the cylinder wall on the high pressure side of the piston which is uncovered by the piston when the unit has been extended to a predetermined length. If the loading of the vehicle is increased the unit is contracted and during subsequent cycles more liquid is drawn from the reservoir and pumped into the pressure chamber to raise the pressure therein to a value sufficient to support the load, the control port being opened again when the length of the unit has returned to its predetermined maximum permitted value.

According to my invention, in a hydropneumatic suspension unit of the kind set forth above, the return of liquid from the pressure chamber to the reservoir is controlled by a valve located on the axis of the unit and controlled either directly or indirectly by the position of the piston in the cylinder.

One advantage of my improved construction is that it enables the axial length of the piston to be reduced as the piston only has to take the side load and does not have to act as a closure for a control opening in the cylinder wall.

Several embodiments of my invention are illustrated by way of example in the accompanying drawings in which:

FIGURE 1 is a longitudinal section of a suspension unit for a vehicle incorporating an axially located valve;

FIGURE 2 is a longitudinal section of part of the suspension unit shown in FIGURE 1 but showing a modified axially located valve;

FIGURE 3 is a longitudinal section of part of the suspension unit illustrated in FIGURE 1 but showing a further modified form of the axially located valve;

FIGURE 4 is a lonigtudinal section of a further embodiment of a suspension unit for a vehicle; and FIGURE 5 is a lonigtudinal section of a further modified form of the suspension unit shown in FIGURE 4.

In the unit shown in FIGURE 1 which is adapted to be connected between sprung and unsprung parts of a vehicle, a low pressure reservoir 10, adapted to be filled with liquid, is formed between a working cylinder 11 and an outer shell 12. One end of the cylinder connected to a pressure chamber 13 is closed by a plug 14 through which extend offset passages 15 controlled by oppositely acting valves (not shown) operating to allow liquid to pass between the chamber 13 and the interior of the cylinder in both directions but providing a certain amount of damping. The pressure chamber is divided by a diaphragm and the space above the diaphragm is filled with air or gas under pressure and the space below the diaphragm is filled with liquid.

A blind axial bore 16 in the end of the plug next to the cylinder is in communication through a radial passage 17 in the plug and a passage 18 in the wall of the pressure chamber with the reservoir 10. The lower end of the bore 16 is normally closed by a valve head 19 engaging a seating 20 around the bore and carried on the upper end of an axially extending stem 21 which is slidably guided in spaced nylon or other bearings 22 and 23 in a sleeve 24 mounted in a piston 25 which works in the cylinder 11. The lower end of the stem is fixed in a disc 26 which is slidable in an axial recess 27 in a piston rod 28 carrying the piston 25. A compression spring 29 is located in the recess 27 between the disc and the lower end of the recess and urges the valve stem upwardly to hold the valve head 19 in engagement with the seating.

The piston rod 28 works through a bore 30 in the lower end of the outer shell 12 and an annular space 31 formed in the outer shell between the lower end of the cylinder 11 and the piston rod 28 communicates with an annular space 32 around the piston rod 28 above the space 31 and below the piston. The axial length of the annular space 32, and hence its volume, varies with relative axial movement between the piston and the cylinder.

The annular space 32 is in communication with the reservoir 10 by one-way valves 33 controlling passages 34 in the outer shell 12 so that when the unit is compressed axially and the volume of the space 32 increases, liquid will be drawn into that space from the reservoir.

Passages 36 in the piston controlled by one-way valves 37 provide communication between the annular space 32 and the interior of the cylinder 11 so that when the unit is extended axially and the volume of the annular space 32 is reduced, liquid is forced out of the space through the valves 37 and into the upper end of the cylinder.

When the unit has been extended to its permitted maximum length, the disc 26 on the lower end of the valve stem abuts against the lower bearing 23 in the sleeve 24 in the piston and on any further extension of the unit the valve head 19 is positively retracted from its seating 20 so that liquid can return from the high pressure end of the cylinder to the reservoir. On contraction of the unit the valve head 19 is resiliently urged against its seating 20 again by the spring 29.

The valve head 19 conveniently comprises a resilient rubber or like disc or washer mounted in a recess in a cup shaped member 38. The internal diameter of the recess is slightly greater than that of the valve seating 20 and its depth is less than that of the resilient disc which is protected against deterioration by the rim of the recess. Radial slots may be formed in the rim so that the liquid pressure only acts on the area of the seating and a relatively small force is required to open the valve.

FIGURE 2 shows a modification of the unit illustrated in FIGURE 1 and which operates in substantially the same manner and corresponding reference numerals have been used to indicate corresponding parts. In this arrangement the upper end 40 of the stem 21 is conical and cooperates with a complementary seating in an axial bore 41 in the plug 14 at the upper end of the cylinder 11, the bore 41 communicating by way of the radial passage 17 with the reservoir 10.

The embodiment shown in FIGURE 3 is a further modified arrangement of the unit shown in FIGURE 1 and which operates in substantially the same manner and corresponding reference numerals have been used to indicate corresponding parts. In this arrangement a bore 42 extending through the plug 14 at the upper end of the cylinder and communicating with the reservoir 10 by passages 43 and 18 has an internal valve seat 44 at its upper end. This seat is normally engaged by a valve plunger 45 which is axially slidable in the bore 42 and is sealed by an O-ring 46 housed in an annular groove 47 in the plunger. Alternatively the O-ring 46 may be housed in an annular groove in the bore 42.

The lower end of the plunger 45 projects below the plug and has mounted on it a peripherally flanged disc 48. A compression spring 49 is located between the disc and the piston 25 and normally holds the valve plunger in engagement with the seat 44.

A short spring 50 housed in an annular recess 51 in the plug bears on the upper side of the disc on which it acts in a direction urging the valve plunger away from its seat.

So long as the length of the unit is less than its permitted maximum valve the spring 49 exerts a greater force on the valve than the short spring 50 and the valve remains closed, but when the length of the unit approaches that value, the force exerted by spring 49 has been reduced sufficiently to allow spring 50 to open the valve.

If spring 49 should break or otherwise become ineffective the valve will be opened by spring 50 so that there is no risk of an excessive extension of the unit.

In the unit shown in FIGURE 4, a working cylinder 60 open at its lower end is secured at its upper end to a closure 61 for an opening in the lower end of a pressure chamber 62 divided by a diaphragm 63, the space 64 above the diaphragm being filed with air or other gas under pressure and the space 59 below the diaphragm being filled with liquid. A plug 65 screwed or otherwise secured into an axial bore 66 in the closure has on its lower end an annular seating 67 around an axial passage 68 extending upwardly to meet a radial part 69 in the closure leading into the upper end of a reservoir 70 formed by the annular space between the working cylinder 60 and a concentric outer shell 71.

The outer shell 71 is welded or otherwise secured at its upper end to the pressure chamber 62, and its lower end is closed by a bush or equivalent member 72 through which works a piston rod 73 carrying a piston 74 working in the working cylinder 60, the bush incorporating an O-ring or other seal 87. The working cylinder 60 terminates at its lower end short of the bush so that an annular clearance 76 around the piston rod below the piston is in open communication with the reservoir.

The piston rod 73 is hollow and the lower end of an axial rod 77 slidably guided in a bush 78 mounted in the piston 74 extends into the bore 79 of the piston rod, the diameter of the rod being less than that of the bore. The upper end of the bore communicates through a one-way valve 80 in the piston with the cylinder above the piston and through a second one-way valve 81 in the wall of the piston rod with the clearance 76 around the piston rod.

The upper end of the axial rod 77 is recessed to receive a washer 82 adapted to engage the seating 67 in the closure for the upper end of the working cylinder 60 and closes the passage 68 leading to the reservoir 70.

The axial rod 77 is urged upwardly to hold it in engagement with the seating by a compression spring 83 housed in the bore 79 of the piston rod, the upper end of the spring abutting a collar 84 which is fixed on the lower end of the axial rod 77 and is of greater diameter than the rod.

The upper end of the working cylinder 60 communicates with the liquid space 59 in the pressure chamber 62 through offset passages 85 in the closure controlled by oppositely acting one-way valves or by restrictors 86 which allow liquid to pass between the chamber and the cylinder in both directions but provide a certain amount of damping.

The unit is adapted to be connected in the usual way between sprung and unsprung part of a vehicle, and when the vehicle is travelling, suspension movements produce contraction and expansion of the unit.

On contraction of the unit the axial rod 77 moves into the bore 79 in the piston rod and displaces liquid from it through the one-way valve 80 in the piston 74 and so into the liquid space 59 in the pressure chamber.

On expansion of the unit the axial rod 77 moves upwardly relative to the piston and liquid is drawn from the reservoir 70 through the annular space 76 around the piston rod and through the one-way valve 81 into the bore 79 of the piston rod.

Liquid is thus pumped from the reservoir 70 into the pressure chamber 62 and the axial length of the unit increases until the collar 84 on the lower end of the axial rod 77 engages the lower end of the bush 78 in the piston through which it works. On any further extension of the unit the rod is retracted from the valve seat 67 on the closure 61 for the upper end of the working cylinder and liquid is allowed to return from the pressure end of the cylinder to the reservoir 70.

If the loading of the vehicle is increased the unit is contracted and the upper end of the axial rod 77 engages its seating and pumping is resumed, the pumping continuing until the unit has returned to its predetermined axial length. It will be appreciated that in this arrangement a seal 87 provided for the piston rod where it works through the bush 72 closing the lower end of the reservoir is only subjected to the pressure in the reservoir.

The reservoir is preferably partially occupied by a longitudinally fluted bag 88 containing air or other gas to take care of fluctuations in the volume of liquid in the reservoir.

The outer end of the piston rod 73 may house within its bore 79 a fitting 89 containing a one-way valve 90 through which the unit can be charged with liquid after removal of a plug 91 closing the end of the bore.

In a modified form of suspension unit shown in FIGURE 5, there is secured in the upper end of a working cylinder 100 a plug 101 to which is secured a pressure chamber 102 divided by a diaphragm 103 into an upper chamber 104 containing air or other gas under pressure and a lower liquid chamber 105 in communication with the upper end of the cylinder through a passage or passages 106 in the plug controlled by a valve or valves 124 providing damping of the flow of liquid in both directions between the cylinder and the pressure chamber.

The working cylinder 100 is enclosed within a concentric outer cylindrical shell 108 of which the upper end is secured to the pressure chamber and the lower end is closed by a closure member 109 through which works a hollow piston rod 110 carrying at its upper end a piston 111 working in the working cylinder 100.

An annular space 112 formed between the working cylinder 100 and the outer shell 108 is divided into two by a stationary ring 113, the space above the ring forming a reservoir which is filled with liquid and may contain a flexible bag 114 filled with air or gas.

An axial rod 115 having an axial bore 116 is slidably guided at its lower end in the piston 111 and is coupled to the piston and piston rod assembly by means permitting a small amount of relative axial movement, the lower end of the bore 116 in the rod 115 opening into the bore 121 of the piston rod which is in communication with the cylinder above the piston through a one-way valve 123 in the piston. The upper end of the rod 115 co-operates with a central seating 124 comprising two annular seats on the underside of the plug 107 at the upper end of the working cylinder 100, the space 125 within the seating being connected to the reservoir through a bleed passage 126. A central passage 127 controlled by one-way valve 128 also provides communication between the reservoir and the cylinder 100.

On extension of the unit when under pressure, the pressure within the bore 121 of the piston rod 110 is reduced and liquid is drawn from the reservoir through the bore 116 in the axial rod 115 and the one-way valve 128 in the plug 107. On contraction of the unit the axial rod 115 moves into the bore 121 of the piston rod and forces liquid through the one-way valve 123 in the piston into the upper part of the cylinder 100 and so into the pressure chamber.

Normally the upper end of the axial rod 115 is resiliently held by a compression spring 129 in the bore 121 of the piston rod in engagement with the seating 124 on the plug at the upper end of the cylinder so that the passage 127 leading to the reservoir is closed, but when the unit has been extended to a predetermined length the rod 115 is withdrawn from the seating by the lost-motion connection between its lower end and the piston and piston rod assembly so that the bleed passage 126 is opened to allow liquid to return from the upper end of the cylinder to the reservoir and no further extension of the unit takes place.

The portion of the annular space 112 between the working cylinder 100 and the outer shell 108 and below the stationary ring 113 is in communication with the lower end of the working cylinder which terminates short of the bottom closure of the outer shell, and this space is divided by an axially extending diaphragm 130 of sleeve form. The upper end of the diaphragm 130 is secured in an annular recess 131 in the bottom of the ring at its inner edge and the lower end is secured in an annular groove 132 in the inner surface of the outer shell adjacent to the upper end of the bottom of the closure member 109. The space 133 on the outer side of the diaphragm between it and the outer cylinder is filled with air or other gas under pressure, and the space 134 on the inner side which is continuous with annular space 135 between the piston rod 110 and the working cylinder 100 below the piston is filled with liquid on which a pressure is maintained by the air or gas on the outer side of the diaphragm.

When the unit is extended the working cylinder 100 moves upwardly relative to the piston so that the space below the piston is reduced and the pressure of the liquid acting on the underside of the piston increases and produces a snubbing effect.

The additional air spring is housed within the length of the outer shell 108 so that its presence does not add to the overall length of the unit though a slight increase in the diameter of the outer shell may be necessary.

Another advantage of the additional air spring is that it makes the unit less sensitive to temperature changes as the normal increase in the downward pressure acting on the piston which is caused by an increase in working or ambient temperature is counteracted by a corresponding increase in the pressure acting on the underside of the piston and produced by the additional air spring.

I claim:

1. A hydro-pneumatic suspension unit for a vehicle adapted to act as a self-adjusting strut comprising a cylinder having a first end and a second end, a pressure chamber communicating with one end of the cylinder and containing a gas and a liquid, a piston member working in the cylinder, a piston rod member at one end carrying said piston and at its other end projecting from the other end of said cylinder, a working chamber in said cylinder between said one end and said piston, a pumping chamber in said cylinder between said piston and said other end of said cylinder, a first one-way valve in said piston to allow liquid flow from said pumping chamber into said working chamber, a reservoir for liquid, passage means connecting said reservoir to said pumping chamber, a second one-way valve associated with said passage means to allow liquid flow from said reservoir into said pumping chamber, outlet means from said working chamber located at said one end of the cylinder, means defining a passage connecting said outlet means and said reservoir directly, a valve co-operating with said outlet means, spring means engaging said valve to bias said valve to a position closing said outlet means whereby said valve maintains said outlet means closed while said piston occupies a first range of positions relative to said cylinder, and mechanical means co-operating with said piston and said valve to move said valve positively to open said outlet means when said piston moves into a second range of positions relative to said cylinder, the position of the piston in said first range, when the piston is about to enter said second range, corresponding to the preferred adjusted length of the unit.

2. The unit of claim 1 wherein the outlet means from said working chamber is located at said one end of the cylinder on the longitudinal axis thereof.

3. The unit of claim 2 wherein said reservoir comprises an annular tank member surrounding at least a part of said cylinder and wherein said passage means extends from said outlet means beyond the outer circumference of said cylinder and into said reservoir.

4. The unit of claim 2 wherein said outlet means is located in said closure at said one end on the longitudinal axis of said unit, and wherein said last named valve seats around said outlet means, means defining said passage means being located in said closure, a freely axially movable rod working in an axial board in said piston rod, means at the upper end of said rod for operatively connecting the same to said last named valve, a collar on the lower end of said rod and of greater diameter than the rod to afford a stop limiting movement of said rod out of said piston rod, a compression spring housed within the axial bore in said piston rod and abutting at its upper end against said collar to urge said rod upwardly to retain said valve against said outlet means to close the same while said piston occupies said first range of position relative to said cylinder, and means carried by said piston for engaging said collar to move said rod and said valve positively away from said outlet means when said piston moves into said second range of positions relative to said cylinder.

5. The unit of claim 4 including a conical valve seat surrounding said outlet means and wherein said last named valve comprises a conical portion on the upper end of said axial rod and co-operating with said conical seat to control the flow of liquid through said outlet means.

6. The unit of claim 4 wherein said outlet means includes an axial bore in the closure at said one end and a plunger slideable in said bore in said closure, said last named valve being seated on the upper end of said axial bore, a compression spring in said working chamber and engageable between said piston and said plunger to bias the latter to a position in which it co-operates with said valve to close said outlet means when said piston occupies a first range of positions relative to said cylinder, and a short spring operating between said plunger and said closure to positively move said plunger away from said valve to open the same when said piston moves into a second range of positions relative to said cylinder.

7. An hydro-penumatic suspension unit for a vehicle adapted to act as a self-adjusting strut comprising a cylinder having a first end and a second end, a closure closing said first end of said cylinder, a pressure chamber communicating with said first end of said cylinder through passages in said closure and containing a liquid and a gas, a piston working in the cylinder, a piston rod at one end carrying said piston and projecting at its other end from said second end of said cylinder, a working chamber in said cylinder between said first end and said piston, a pumping chamber in said cylinder between said piston and second end of said cylinder, a first one-way valve in said piston to allow liquid flow from said pumping chamber into said working chamber, a reservoir for liquid, a second one-way valve to allow liquid flow from said reservoir to said pumping space, two annular valve seatings on said closure, outlet means from said working chambers defined by a bleed passage in said closure between said valve seatings, means defining first passage means in said closure connecting said outlet means and said working chamber directly, said second one-way valve controlling second passage means in said closure communicating with said first passage means, a freely axially movable axial rod located on the axis of the unit and working in an axial bore in said piston rod, a collar on the lower end of said axial rod and of a diameter greater than the diameter of the axial rod forming a stop limiting movement of said axial rod out of said piston rod, a compression spring housed within the axial bore in said piston rod and abutting at its upper end against said collar to urge said axial rod upwardly to hold said axial rod at its upper end against said annular valve seatings whereby said axial rod maintains said outlet means closed while said piston occupies a first range of positions relative to said cylinder, and means defined by the co-operation of said collar with said piston to move said axial rod positively away from the annular valve seatings when the piston moves into a second range of positions relative to said cylinder, the position of the piston in said first range, when the piston is about to enter said second range, corresponding to the preferred adjusted length of the unit.

8. An hydro-pneumatic suspension unit for a vehicle adapted to act as a self-adjusting strut, comprising a cylinder having a first end and a second end, a cylindrical outer shell, an annular chamber between said cylinder and said outer shell, a stationary annular ring dividing said annular chamber into two annular spaces, the annular space above the ring defining a reservoir for liquid, a diaphragm of sleeve form dividing the annular space below said annular ring into two compartments of which the compartment on the outer side of the diaphragm between it and the outer shell is filled with gas under pressure, a first closure closing said first end of said cylinder, a pressure chamber communicating with said first end of said cylinder through passages in said first closure and containing a liquid and a gas, a piston working in the cylinder, a piston rod of less diameter than the cylinder, said piston rod at one end carrying said piston and projecting at its other end from said second end of said cylinder, a second closure for the second end of said cylinder and said outer shell through which said piston rod works, a working chamber in said cylinder between said first end and said piston, said piston and said second closure of said cylinder defining the ends of an annular space of variable axial length between the piston rod and the cylinder, means providing communication between the lower end of said annular space and the compartment on the inner side of said diaphragm, between it and the cylinder whereby an extension of the unit and relative axial movement between said piston and said cylinder in one direction said annular space between said piston rod and said cylinder decreases in length and liquid is forced from said annular space into the compartment on the inner side of the diaphragm between it and the cylinder and exerts an increasing pressure on the underside of the piston thus producing a snubbing action, a pumping chamber between said piston and said second end of the cylinder, a first one-way valve in said piston to allow liquid flow from said pumping chamber into said working chamber, a second one-way valve to allow liquid flow from said reservoir into said pumping chamber, outlet means in said first closure on the longitudinal axis of the cylinder, means defining a passage connecting said outlet means and said reservoir directly, a valve co-operating with said outlet means, spring means engaging between said valve and said piston rod to bias said valve to a position closing said outlet means whereby said valve maintains said outlet means closed while said piston occupies a first range of positions relative to said cylinder, and means to move said valve positively to open said outlet means when said piston moves into a second range of positions relative to said cylinder, the position of the piston in said first range, when said piston is about to enter said second range, corresponding to the preferred adjusted length of the unit.

9. An hydro-pneumatic suspension unit as claimed in claim 8, wherein the stationary annular ring dividing said annular chamber between the cylinder and the outer shell has in its lower face and at its inner edge an annular recess, and an annular groove is formed in the upper face of the closure for the second end of the cylinder and the outer shell through which said piston rod works, said axially extending diaphragm being secured at its upper edge in said recess and at its lower edge in said groove.

References Cited by the Examiner

UNITED STATES PATENTS

| | | | |
|---|---|---|---|
| 1,291,016 | 1/1919 | Kellogg. | |
| 1,426,057 | 8/1922 | Fritz. | |
| 1,457,157 | 5/1923 | Galbraith. | |
| 1,486,911 | 3/1924 | Messier. | |
| 2,436,573 | 2/1948 | Heynes. | |
| 2,756,048 | 7/1956 | Pfeiffer et al. | 267—65 |
| 2,938,542 | 5/1960 | Depman | 267—65 |
| 2,976,032 | 3/1961 | Sampietro | 267—64 |
| 2,997,291 | 8/1961 | Stultz | 267—64 |
| 3,033,556 | 5/1962 | Wassner. | |
| 3,083,026 | 3/1963 | Broadwell. | |
| 3,109,638 | 11/1963 | Riemer | 267—64 |

FOREIGN PATENTS

| | | |
|---|---|---|
| 536,263 | 4/1941 | Great Britain. |
| 869,132 | 5/1961 | Great Britain. |

ARTHUR L. LA POINT, *Primary Examiner.*